United States Patent [19]
Sekiguchi et al.

[11] 4,058,797
[45] Nov. 15, 1977

[54] TURN SIGNAL SYSTEM

[75] Inventors: Tomoaki Sekiguchi, Hamamatsu; Hiroyasu Miyao, Iwata; Hidekazu Shimizu, Hamamatsu, all of Japan

[73] Assignee: Yamaha Hatsudoki Kabushiki Kaisha, Japan

[21] Appl. No.: 692,320

[22] Filed: June 3, 1976

[30] Foreign Application Priority Data

June 9, 1975 Japan ............................... 50-77761

[51] Int. Cl.² .................... B60Q 1/00; H01H 3/16
[52] U.S. Cl. ...................................... 340/56; 340/73; 200/61.27
[58] Field of Search ............... 340/56, 62, 73, 81 R, 340/56, 62; 200/61.27

[56] References Cited

U.S. PATENT DOCUMENTS

| 3,319,073 | 5/1967 | Wrin | 340/73 X |
| 3,555,507 | 1/1971 | Burson, Jr. | 340/73 X |
| 3,746,807 | 7/1973 | Yasuda | 340/56 X |

Primary Examiner—Donald J. Yusko
Attorney, Agent, or Firm—Flynn & Frishauf

[57] ABSTRACT

A turn signal system for a vehicle which comprises an automatically resettable actuating switch mechanism, an electronic control unit to produce a cancelling signal after a predetermined time interval on the basis of a signal supplied by a speed detection unit, an intermittently lighting device controllable by said cancelling signal so as to be terminated by said cancelling signal, and one or more pairs of direction display lamps provided on both right and left sides of a vehicle.

21 Claims, 13 Drawing Figures

TURN SIGNAL SYSTEM

BACKGROUND OF THE INVENTION

This invention relates to a turn signal system for a vehicle which comprises means to indicate a right or left turn of the vehicle and to automatically cancel the turn signal indication.

With a direction-indicating device for vehicles, there have been proposed various means for returning a direction-indicating member to the original position after said member has completed the indication of turning directions. With a four-wheeled automobile, the return of a direction-indicating member can be easily effected through utilization of the automatic returning action of a steering wheel or handle after it has been used to divert the course of the automobile to the right or left. In the case of a motorcycle, however, difficulties arise in utilizing the return of the steering handle in order to terminate a direction-indicating action.

To date, a direction-indicating device has been proposed for motorcycles which determines a point of time at which a direction-indicating operation should terminate from a distance covered by a motorcycle or a length of time for which the motorcycle has traveled after completion of the indication of a direction. Then, automatic return of said direction-indicating device is affected. However, the prior art direction-indicating device has only taken into acount a distance covered by a motorcycle or a length of time for which the vehicle travels after operation of the direction-indicating device, presenting difficulties in practical application. For example, a direction-indicating device which is designed to automatically return to the original position when a motorcycle has run a prescribed distance after indication of a direction is completed has the drawback that where a motorcycle travels fast, for example, in outrunning the preceding vehicle, the direction-indicating device sometimes undesirably regains the original position before said outrun is fully brought to an end, possibly giving rise to a traffic accident. Another type of direction-indicating device which is designed to regain the original position when a motorcycle has traveled for a certain length of time after operation of said device is finished also has the drawback that where the motorcycle runs slowly, for example, in making a left turn at a cross-road and moreover another straight-moving vehicle follows said motorcycle, a left turn display device is possibly extinguished before said motorcycle completes the left turn, making it necessary to carry out the indication of the left turn over again in order to avoid a possible collision with the following vehicle.

The above-mentioned prior art direction-indicating device is designed to regain the original position by electrical means, for example, by an electromagnetic solenoid, or by mechanical means, for example, a link mechanism. In either case, the conventional turn signal indicating device is defective in that the device is of complicated arrangement, becomes bulky, and, is not optimally applicable to a motorcycle.

SUMMARY OF THE INVENTION

It is accordingly the object of this invention to provide a turn signal system for a vehicle which can automatically cancel the indication of a direction always in a proper timing regardless of the traveling speed of the vehicle and, if necessary, can regain the original position by a manual operation.

Another object of the invention is to provide a turn signal system comprising a mechanical operation mechanism which returns to its original position ready for the next operation after the turn signal is generated, and an electrical mechanism substantially cancelling the turn signal indication operation.

According to an aspect of this invention, there is provided a turn signal system for vehicles which comprises an actuating switch mechanism capable of automatically regaining its original position, an electronic control unit to produce a cancelling signal after a predetermined time interval on the basis of a signal supplied by a speed detection unit, an intermittently lighting device controllable by said cancelling signal so as to be terminated by said cancelling signal, and one or more pairs of direction display lamps provided on both right and left sides of a vehicle.

DETAILED DESCRIPTION OF THE PREFERRED EMBODIMENTS

ACTUATION SWITCH DEVICE

Referring to FIGS. 1, 2, 3, 4, 5 and 6 a metal plate actuating lever 11 is rotatably fitted to the upper end portion of a projection 8 formed in a casing 9 made of, for example, an aluminum die casting by a threaded shaft 12 through a shoulder washer 10. The actuating lever 11 is bored with a slot 13 whose shorter diameter is slightly longer than the diameter of the shoulder portion of the shoulder washer 10, and whose longer dimension extends lengthwise of the actuating lever 11. The actuating lever 11 is fitted to the casing 9 by the threaded shaft 12 with the slot 13 disposed on the shoulder portion of the shoulder washer 10. Therefore, the actuating lever 11 can rotate about the threaded shaft 12 and move in the direction of the longer dimension of the slot 13, namely, lengthwise of the actuating lever 11. The outer end portion of the actuating lever 11, which projects outside of the casing 9 constitutes a knob 14. The knob 14 is formed of, for example, plastic material and has its surface impressed with characters L, R respectively denoting the right and left turns of a motorcycle.

Figure 1:
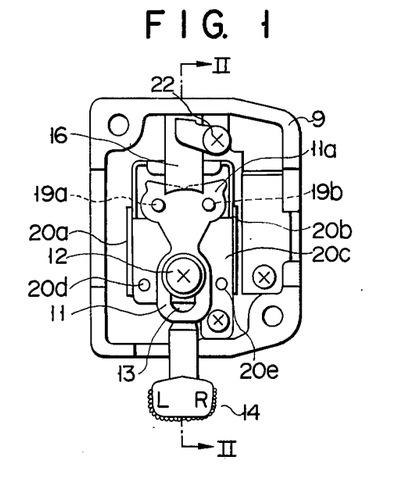
FIG. 1 is a plan view of an actuation switch device embodying this invention with a cover taken off.
Figure 2:
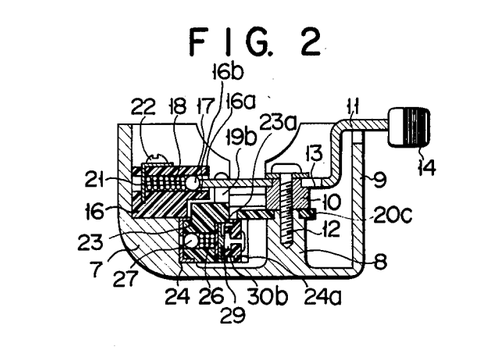
FIG. 2 is a cross sectional view on line II—II of FIG. 1.
Figure 3:
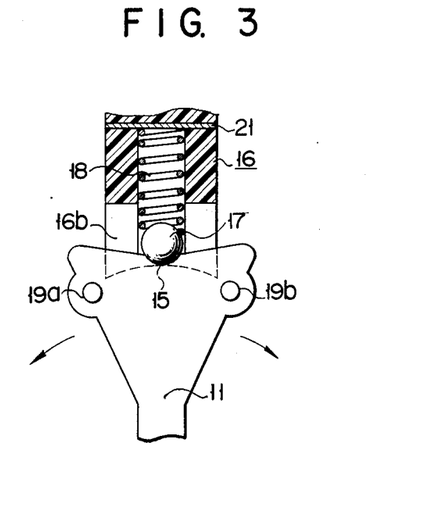
FIG. 3 is an enlarged plan view, partly in section, of the driving end portion of the actuating lever of FIG. 1.

The opposite end portion of the actuating lever 11 to the knob 14 constitutes a driving end portion 11a formed of a fan like plate. The end side of the driving end portion 11a presents an extremely flattened V shape. When the actuating lever takes an initial position as shown in FIG. 1, the center of the V-shaped end side of the driving portion 11a is less spaced from the center of the threaded shaft 12 than any other portion of the V-shaped end side.

An engagement notch 15 (FIG. 3) is formed at the center of the V-shaped edge of the driving end portion 11a. A steel ball 17 received in a supporting block 16 is normally pressed against the V-shaped edge of the driving end portion 11a by a coil spring 18 inserted into the supporting block 16. Therefore, the actuating lever 11 is capable of a swinging motion as indication by the arrows in FIG. 3. Where said steel ball 17 is normally fitted into the engagement notch 15 and also, the actuating lever 11 occupies an initial position. The supporting block 16 comprises a pair of guide plates 16a, 16b so projecting as to clamp the driving end portion 11a from both above and below and contains a coil spring 18 for pressing the steel ball 17 against the V-shaped edge of the driving end portion 11a. The paired guide plates 16a, 16b may be formed by hollowing out one end portion of the supporting block 16 to a sufficient depth to allow the actuating lever 11 to be inserted into the casing 9 lengthwise of the slot 13. One end of the coil spring 18 abuts against the steel ball 17 and the other end thereof is pressed in the supporting block 16 against an end plate 21 fixed to the casing 9 by a screw 22. The actuating lever 11 is normally pressed in the direction toward the knob 14 by the steel ball 17 which is always urged by the spring 18. When the actuating lever 11 swings to the right or left, the steel ball 17 is made to roll along the V-shaped edge of the driving end portion 11a of the actuating lever 11. When the knob 14 is released from the swinging force of the finger, then the actuating lever 11 automatically regains an initial position where the steel ball 17 falls into the engagement notch 15, by interaction between the spring 18 and the V-shaped edge of the driving end portion 11a of the actuating lever 11. The supporting block 16 is fitted by the screw 22 to a stepped portion 7 (FIG. 2) formed on the inner wall of the casing 9. The driving end portion 11a is provided with a pair of metal pins 19a, 19b at both sides and which are located equal distances from the engagement notch 15. Namely, the pins 19a, 19b are disposed at such positions as prevent to themselves from striking against the support block 16 when the actuating lever 11 swings, and also at such an interval as is slightly larger than the width of the supporting block 16. This arrangement allows the actuating lever 11 to be pushed in only in an initial or central position and prevents the lever 11 from being pushed in when it swings, because one of the pin 19a or 19b will contact the end of the guide plates 16a, 16b.

A pair of contacts 20a, 20b are provided on a locus traced by the pins 19a, 19b when the actuating lever 11 swings to the right or left. The contacts 20a, 20b are formed of resilient conductive plates fixed by the corresponding pins 20d, 20e to the side surface of an insulation support plate 20c fitted to the projection 8 by means of the screw 12. The pins 20d, 20e are connected together by a lead line (not shown) on the backside of the insulation support plate 20c. A lead line is drawn out of the casing 9 from the pin 20e. When the actuating lever 11 swings to the right or left, the pin 19a or 19b contacts the corresponding contact 20a or 20b. These pins 19a, 19b and contacts 20a, 20b jointly constitute the later described second switching means. The actuating lever 11 which is a conductor is brought to ground potential when the casing 9 is grounded. The lead line extending out of the casing 9 from the pin 20e also has a ground potential when the pin 19a or 19b touches the corresponding contact 20a or 20b. The lead line is connected, as later described, to the terminal T2 of FIG. 7.

A selectively movable block means including a selectively movable plastic member 23 driven by the pins 19a, 19b is disposed below the driving end portion 11a of the actuating lever 11. The selectively movable member 23 is received in a stationary U-shaped metal case 24 and is supported on a guide plate 25 integrally formed at the bottom of the case 24 so as to slide to the right and left. The open side of stationary U-shaped case 24 is closed by an insulation terminal plate 24a. A projecting ridge 24b formed on the insulation terminal plate 24a is fitted into a recess (not shown) formed in the selectively movable member 23. This selectively movable member 23 is supported at the opening of the stationary case 24 so as to slide to the right and left. The selectively movable member 23 contains a coil spring 26 and a steel ball 27 always pressed against the rear wall of the stationary case 24 by the coil spring 26. The rear wall of the stationary case 24 is bored with two engagement hollows, for example, holes 28a, 28b. Engagement of the selectively movable member 23 is determined as the steel ball 27 falls into the engagement hole 28a or 28b with either side wall of the selectively located member 23 pressed against the right or left side wall of the stationary case 24. A U-shaped movable contact member 29 (FIGS. 4 and 5) is fitted into a recess (not shown) formed in the selectively movable member 23. Namely, said selectively located block means is formed of the selectively movable member 23 and the movable contact 29. When the selectively movable member 23 takes a position shown in FIGS. 4 and 5, a pair of contacts 29a, 29b formed on the bottom wall of the movable contact member 29 fully touch the fixed contacts 30a, 30b respectively formed on the insulation terminal plate 24a by being pressed against said fixed contacts 30a, 30b by means of coil spring 26 through an insulation plate 29c. Under this condition, the fixed contacts 30a, 30b are short-circuited by the movable contact 29. Where the selectively movable member 23 is moved to the right until the steel ball 27 is fitted into the engagement hole 28b, then the fixed contacts 30b, 30c are short-circuited by the movable contact 29. Where the steel ball 27 occupies the center position between the engagement holes 28a, 28b, then the selectively movable member 23 takes a neutral position. At this time, the movable contact 29 does not touch any of the fixed contacts 30a, 30b, 30c as shown in chain lines in FIG. 5. The movable contact 29, and fixed contacts 30a, 30b, 30c jointly constitute the first switching means. A guide projection 31 is integrally formed on that part of the upper surface of the selectively movable member 23 which faces the actuating lever 11. Both side walls of the guide projection 31 constitute a pair of mutually facing inclined guide plates 32a, 32b collectively presenting a tapered cross section. When the actuating lever 11 is pushed in while in its initial position, the pins 19a, 19b of the actuating lever 11 are pressed against the tapered guide planes 32a, 32b to bring also the selectively movable member 23 to a neutral position. A separating projection 33 (FIG. 6) having parallel planes separated from the pins 19a, 19b, containing from the inclined guide planes 32a, 32b and extending parallel with the central axial line of the selectively movable member 23 is formed on the central linear portion of said member 23. When the actuating lever 11 swings to the right or left, the pin 19a, or 19b is correspondingly abutted against either side wall of the separating projection 33, thereby shifting the selectively movable member 23 to the right or left.

Figure 4:
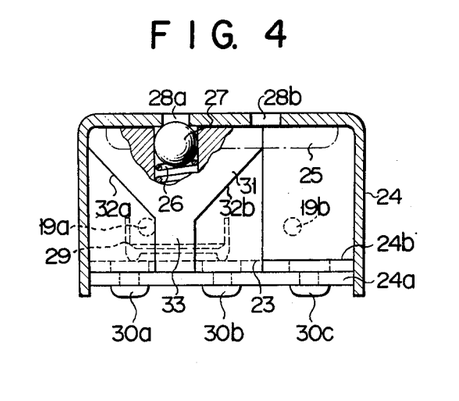
FIG. 4 is an enlarged view of a switch assembly including a selectively located block and fixed contacts taken out of FIG. 2.
Figure 5:
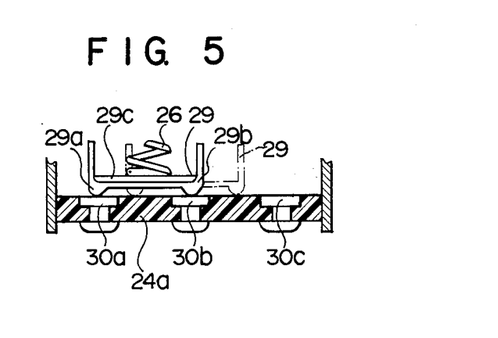
FIG. 5 is a cross sectional view of a switching contact member of first switching means provided in the switch assembly of FIG. 4.
Figure 6:
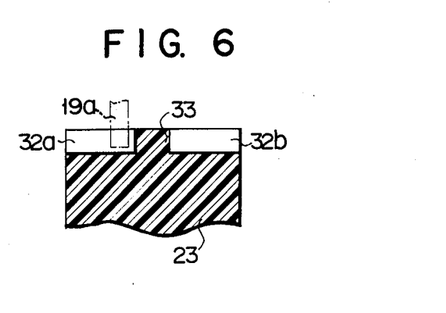
FIG. 6 is a cross sectional view showing the relative position of the switch assembly of FIG. 4 and the driving end portion of the actuating lever.

With the actuation switching device of the abovementioned arrangement, the actuating lever 11 occupies an initial position shown in FIG. 1, when no actuating force is applied to said lever 11. When the actuating lever 11 is made to swing to the right or left by the finger, then the pin 19a or 19b abuts against the corresponding side wall of the separating projection 33, thereby shifting the selectively movable member 23 through the satationary case 24 to the right or left, and in consequence causing the fixed contacts 30b, 30c or the fixed contacts 30a, 30b to be short-circuited by the movable contact 29. At this time, the pin 19a touches the contact 20a (right shift), and the pin 19b abuts against the contact 20b (left shift). When the knob 14 is released from the operation by a finger, the actuating lever 11 automatically returns to its initial position, disconnecting the pins 19a, 19b from the corresponding contacts 20a, 20b. Thus, the space between the pins 19a, 19b is equal to the sum of the width of the separating projection 33 and the stroke of the pins 19a, 19b. Since, however, the pins 19a, 19b are widely spaced from each other, the selectively movable member 23 keeps a position as shown in FIG. 4, with an intersection between the fixed contacts 30a, 30b short-circuited by the movable contact 29. Where the actuating lever 11 is pushed into the casing 9 while the selectively movable member 23 takes a position shown in FIG. 4, then the pin 19a abuts against the inclined guide plane 32a, shifting the selectively movable member 23 to the neutral position. The selectively movable member 23 is brought to rest when the pins 19a, 19b are abutted against the inclined guide planes 32a, 32b respectively. Then the fixed contacts 30a, 30b are not connected with each other.

Figure 7:
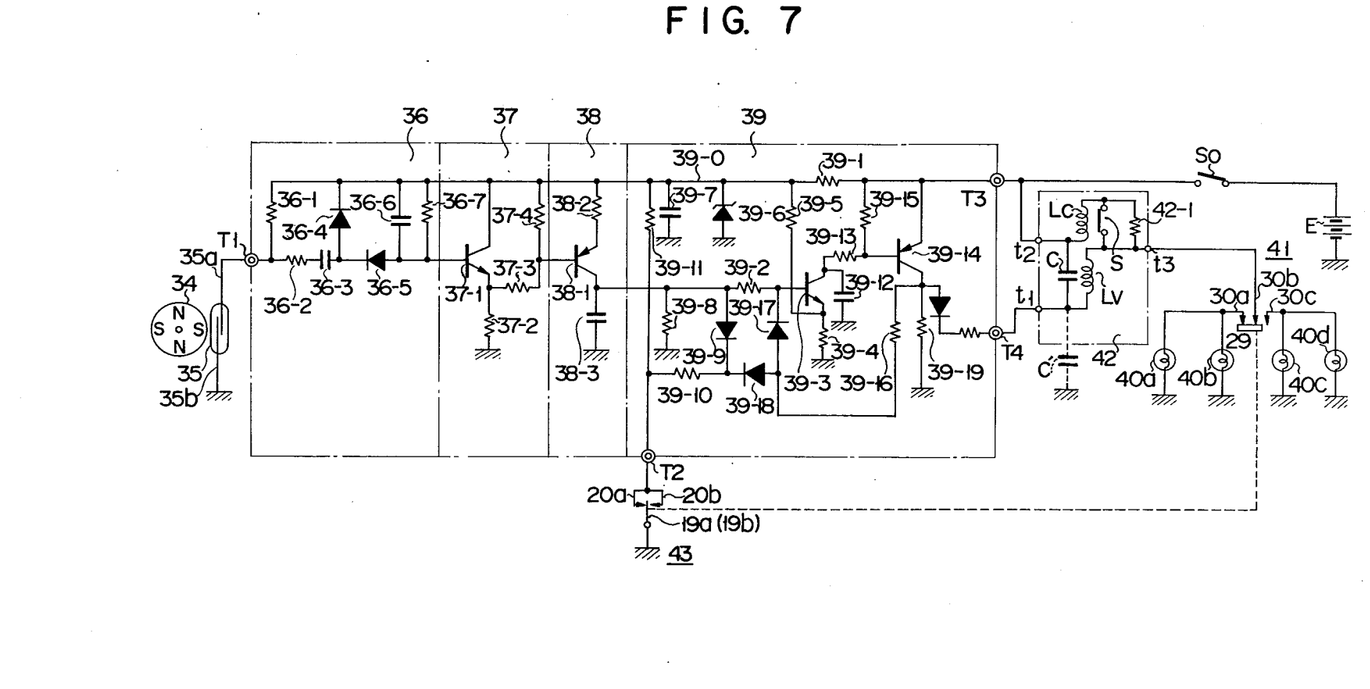
FIG. 7 is a circuit diagram of the self-cancelling turn signal system of the invention.

FIG. 7 is a circuit diagram of a self-cancelling turn signal system for vehicles which is provided with an actuation switching device having the abovementioned arrangement and function.

FLASHER-RELAY UNIT AND DIRECTION DISPLAY MEANS a. Construction of the flasher-relay unit 42

A flasher-relay unit 42 has a signal input terminal t1, a power input terminal t2 and an output terminal t3 and comprises a capacitor C, a resistor 42-1 and an electromagnetic relay which comprises a normally closed relay contact S and two coils, i.e., a voltage coil IV and a current coil LC wound about a magnetic core (not shown). The terminal t2 is connected to a power source E through a power supply switch SO, and also to a juncture of the capacitor C and the current coil LC. The terminal t1 is connected to the other terminal of the capacitor C and one terminal of the voltage coil LV. The construction of the flasher-relay unit 42 is the same as the prior art except for the terminal t1 which is connected to an output terminal T4 of a later described control circuit. The other end of the voltage coil LV is connected to the output terminal t3 and also to the other end of the current coil LC through a parallel circuit of the relay contact S and the resistor 42-1.

b. Operation of the flasher-relay unit 42.

When the switch SO is closed and no output is supplied to the input terminal t1 from the output terminal T4 of a later described control circuit, the flasher-relay unit 42 delivers an output to intermittently energize the lamps 40a, 40b, for example. Thus, when the switch SO is closed, the relay switch S is closed and current is introduced into the display lamps 40a, 40b from the current coil LC through the relay switch S to immediately open the relay switchs. The open state of the relay switch S continues till the charging current flowing through the capacitor C, voltage coil LV, and lamps 40a, 40b decreases to a value which can not hold the relay switch S in the open state. When the capacitor C is fully charged, current passing through the voltge coil LV is extinguished to render the relay switch S again conducting to light the display lamps 40a, 40b. Instantly, the charge stored in the capacitor C is discharged through the current coil LC, relay switch S and voltage coil LV. Since, at this time, the magnetomotive forces generated from the current coil LC and the voltage coil LV counteract with each other the switch S remains closed. When the capacitor C is fully discharged the switch S is opened by the magnetomotive force of the current coil LC and charge current is again introduced into the capacitor C through the voltage coil LV to maintain the relay switch S opened till the charging operation is fully performed. The abovementioned process is repeated to attain the intermittent lighting of the display lamps 40a, 40b. The current flowing through the voltage coil LV is sufficient to open the relay contact S but not so sufficient to light lamps 40a, 40b.

On the other hand, if an output signal is supplied from the terminal T4 to the input terminal t1, a current runs through the display lamps 40a, 40b from the voltage coil LV of the flasher-relay unit 42, and the relay switch S is opened by the operation of the voltage coil LV. Therefore, current from the current coil LC does not travel through the lamps 40a, 40b, preventing them from being lighted.

c. Construction of the direction display means

The direction display means comprises a first switching means 41. This first switching means 41 comprises, as described by reference to FIG. 5, three fixed contacts 30a, 30b, 30c and a movable contact 29 selectively connected to the fixed contacts 30a, 30b or 30b, 30c and normally being in a neutral position. The fixed contact 30a is grounded through parallel arranged direction display lamps 40a, 40b provided at the front and rear parts of, for example, the right side of a vehicle. The fixed contact 30c is grounded through parallel arranged direction display lamps 40c, 40d disposed at the front and rear parts of, for example, the left side of a vehicle.

The first switching means 41 is constructed and operated, as described by reference to FIG. 1, jointly with the movable contact 19a or 19b of the second switching means 43 and also with the actuating lever 11 when it swings.

d. Operation of the direction display means

As has been described above, the direction display lamps 40a, 40b or 40c, 40d are intermittently lighted by the output of the terminal t3 when no output signal is supplied from the terminal T4 to the input terminal t1 and when the movable contact 29 is between the fixed contacts 30a and 30b or between the fixed contacts 30b and 30c. If an output is supplied to the input terminal t1 from the terminal T4, the intermittently lighting operation of the flasher-relay unit is stopped and current flowing through the output terminal t3 decreases to a level not so sufficient to light lamps 40a, 40b or 40c, 40d.

The output signal to stop the operation of the flasher-relay unit 42 is generated from an electric control circuit and delivered from the output terminal T4. The electric control circuit generates said electric control signal from a speed signal which is supplied from a speed detection unit.

SPEED DETECTION UNIT

In the circuit arrangement of FIG. 7, the traveling speed of a vehicle is detected by a 4-pole magnetic disk 34 coupled to any of the wheels of the vehicle, for example, by a link mechanism for joint rotation with said wheel and a reed switch 35 operated by magnetic force of the magnetic disk 34. The reed switch 35 is designed to generate one pulse signal, each time the vehicle runs a certain distance.

Figures 8, 9:
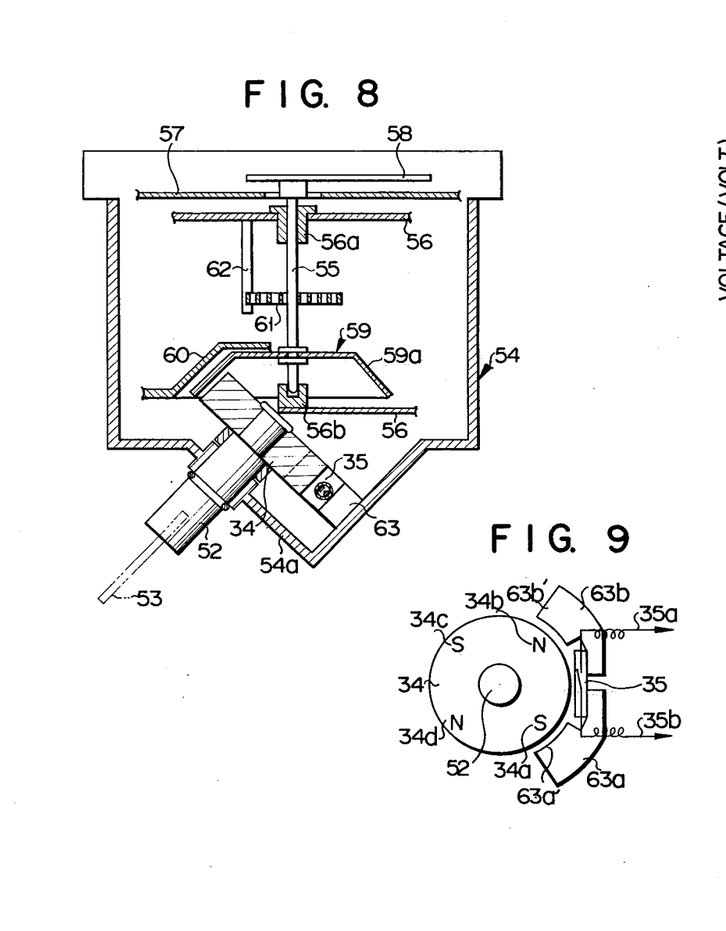
FIG. 8 is a cross sectional view of a speedometer with a speed detection unit included in FIG. 7.
FIG. 9 is a plan view of a rotary wheel and detection element taken out of FIG. 8.

A speed detection unit comprising the rotary magnetic disk 34 and reed switch 35 is arranged in a housing of a speedometer, as shown in, for example, FIGS. 8 and 9. Referring to FIG. 8, the rotary magnetic disk 34 is mounted on a rotary shaft 52, which in turn is rotated by a cable 53 connected to any of the vehicle wheels. The rotary shaft 52 is rotatably supported by a bearing (not shown) provided on an inclined bottom plate 54a of a casing 54 in an inclined position relative to the axial direction of the casing 54. At the axial center of the casing 54, an indication needle-supporting shaft 55 is rotatably supported by a bearing 56a of a frame 56 received in the casing 54. The upper end of the indication needle-supporting shaft 55 which projects above a graduated disk 57 is fitted with a speed-indicating needle 58. The lower end portion of the indication needle-supporting shaft 55 is rotatably supported by bearing 56b fitted to the frame 56. The center of the bottom portion of an induction plate 59 made of electroconductive metal and shaped into an inverted cup form is fixed to the indication needle-supporting shaft 55. The inside of the peripheral wall 59a of said induction plate 59 presenting a conical shape closely faces the opposite side of the rotary magnetic disk 34 to the reed switch 35. A magnetic guide plate 60 is spatially disposed alongside the outside of the peripheral wall 59a. Magnetic pole pieces 63a, 63b (FIG. 9) are provided in close proximity to the peripheral surface of the rotary magnetic disk 34. The reed switch 35 bridges both magnetic pole members 63a, 63b. The inner end of a helical return spring 61 is fixed to the indication needle-supporting shaft 55 and the outer end thereof is secured to a bracket 62 extending downward from the frame 56, thereby enabling the indication needle-supporting shaft 55 to automatically regain a zero position.

The magnetic pole members 63a, 63b are mounted, as shown in FIG. 9, namely, to cause every two adjacent one of the magnetic poles 34a, 34b, 34c, 34d of the rotary magnetic disk 34 to be brought ahead of the projections 63a', 63b' of the magnetic pole pieces 63a, 63b respectively. The reed switch 35 bridges the notched portions of the magnetic pole pieces 63a, 63b. Lead lines 35a, 35b are drawn out of both ends of the reed switch 35.

In the case of FIG. 9, the reed switch 35 bridges the two magnetic pole pieces 63a, 63b. However, it is possible to omit the magnetic pole pieces 63a, 63b and provide only the reed switch 35 close to the peripheral surface of the rotary magnetic disk 34. This arrangement also detects a speed signal. Application of a coil, magneto-sensitive resistor element, Hall effect element etc. can also attain said speed detection.

There will now be described by reference to FIG. 8 the operation of a speedometer with the speed detection unit. When the rotation of any of the wheels of a vehicle is transmitted to the rotary magnetic disk 34 during its run through the cable 53 and rotary shaft 52, then a magnetic flux from the magnetic poles 34a to 34d passes through the induction plate 59 and magnetic guide plate 60. At this time, a rotation torque is generated in the induction plate 59 in proportion to a number of rotations of the rotary magnetic disk 34. In consequence, the indication needle-supporting shaft 55 and indication needle 58 continue to be rotated until the rotation torque balances with the urging force of the helical return spring 61, thereby indicating the running speed of a vehicle by the indication needle 58. The reed switch 35 generates a pulse signal each time a pole piece passes it.

FIG. 8 illustrates a speed signal detector incorporated in a speedometer. However, it is possible to provide a speed signal detector shown in FIG. 9 separately from the speedometer.

ELECTRONIC CONTROL UNIT

The electronic control unit comprises a speed signal circuit 36 receiving a pulse signal from the reed switch 35, a saturable circuit 37, an integrator circuit 38 and a comparing and holding circuit 39. The electronic control unit has an input terminal T1, a reset terminal T2, a source terminal T3 and an output terminal T4.

When a pulse signal delivered from the reed switch 35 is supplied to the input terminal T1 of the speed signal circuit 36, a speed signal corresponding to the pulse rate of the pulse signal is generated in the speed signal circuit 36. The speed signal, which represents the speed of the vehicle, is supplied to the saturatble circuit 37 for detecting the level of the speed signal. The saturable circuit 37 has a predetermined saturation detecting level. When the level of the speed signal is lower than the detecting level, the saturable circuit 37 delivers an output proportional to the level of the speed signal, but when the level is higher than the detecting level, the saturable circuit 37 produces an output having a constant level.

The output of the saturable circuit 37 is then supplied to the integrator circuit 38. When the lever 11 is released and the contacts 19a (19b), 20a (20b) are put in the OFF state, the integrator circuit 38 produces an output proportional to the covered distance of the vehicle or the traveling time period in response to the output of the saturable circuit 37. The output of the integrator circuit 38 is sent to the comparing and holding circuit 39. The comparing and holding circuit 39 comprises a comparing stage and a holding stage. The output of the integrator circuit 38 is first compared with a preset level set in the comparing stage and when the output of the integrator circuit 38 exceeds the preset level an output is sent from the comparing stage to the holding stage. The holding stage holds the output of the comparing stage high. Thus, in this state, the comparing and holding circuit 39 sends out a signal to the flasher-relay unit 42 through the output terminal T4.

Now, the detailed description of the whole construction of the electronic control unit will be further described by referring to FIG. 7.

The input terminal T1 is connected to a junction of resistors 36-1, 36-2 of the speed signal circuit 36. The other end of the resistor 36-1 is connected to a voltage regulated positive line 39-0, regulated by a zener diode 39-6 and a capacitor 39-7 and is supplied through a resistor 39-1 by a positive terminal of a battery E through a power supply terminal T3, terminal t2 and power supply switch S0. The negative terminal of the battery E is grounded. As above, one terminal 35a of the reed switch 35 is connected to the input terminal T1, and the other terminal 35b thereof is grounded. Therefore, the voltage of the input terminal T1 changes within the range of zero to the voltage V of the line 39-0 according as the reed switch 35 is turned on or off.

The other end of the resistor 36-2 is connected to one end of a capacitor 36-3, the other end of the capacitor 36-3 is connected to a junction between an anode of a diode 36-4 and a cathode of a diode 36-5. An anode of the diode 36-5 is connected to one end of the capacitor 36-6 and the resistor 36-7. A cathode of the diode 36-4 and each end of a capacitor 36-6 and resistor 36-7 are jointly connected to the voltage regulated positive in 39-0.

The output voltage from the speed signal circuit 36 is impressed on a base of a transistor 37-1 included in the saturable circuit 37. An emitter of the transistor 37-1 is connected to a junction between resistors 37-2, 37-3. The other end of the resistor 37-2 is grounded, and the other end of the resistor 37-3 is connected to one end of a resistor 37-4. A collector of the transistor 37-1 and the other end of the resitor 37-4 are connected to the positive line 39-0.

An output voltage from the saturable circuit 37 arranged as described above is conducted to a base of a transistor 38-1 of an integrator circuit 38 from a junction between the resistors 37-3, 37-4. An emitter of the transistor 38-1 is connected to the line 39-0 through a resistor 38-2, and a collector of said transistor 38-1 is grounded through a capacitor 38-3.

An output voltage from the integrator circuit 38 arranged as described above is drawn out at a junction between the collector of the transistor 38-1 and the capacitor 38-3, and supplied to a base of a transistor 39-3 through a resitor 39-2 of the comparing and holding circuit 39. An emitter of the transistor 39-3 is grounded through a resistor 39-4 and also connected to the line 39-0 through a resistor 39-5. The Zener diode 39-6 is used for setting a reference voltage, together with a capacitor 39-7. A junction between the capacitor 38-3 and resistor 39-2 is grounded through a resistor 39-8, and also connected to an anode of a diode 39-9. A cathode of the diode 39-9 is connected to the terminal T2 through a resistor 39-10 and also to the line 39-0 through a resistor 39-11. This resistor 39-10 is intended to prevent excess current from being conducted to a switch 43 when said switch 43 is closed. The terminal T2 is connected to the fixed contact side of the second switching means 43.

A collector of the transistor 39-3 is grounded through a capacitor 39-12 and also connected to a base of a transistor 39-14 through a resistor 39-13. Said base is connected to the terminal T3 through a resistor 39-15. An emitter of the transistor 39-14 is connected to the terminal T3, and a collector thereof is connected to anodes of diodes 39-17, 39-18 through a resistor 39-16. A cathode of the diode 39-17 is connected to a base of the transistor 39-3, and a cathode of the diode 39-18 is connected to a junction between the diode 39-9 and resistor 39-10. A collector of the transistor 39-14 also is grounded through a resistor 39-19 and also connected to an output terminal T4 through a diode 39-20 and resistor 39-21.

The speed signal circuit 36, saturation circuit 37, integration circuit 38 and comparison-holding circuit 39 may be integrally enwrapped, for example, in thermosetting plastic material to be kept free from the external intrusion of vibration, shock, heat, dust, water, etc. and preserve stable properties.

TOTAL OPERATION

There will now be described by reference to FIGS. 1, 7, 10 and 11 the operation of a direction-indicating device for vehicles embodying this invention.

Where, the power supply switch S0 is thrown in and the actuating lever 11 is made to swing toward a direction represented by the character R or L impressed on the actuating element 14, then the pin 19a of the second switching means 43 touches the resilient contact 20a, causing the charge of the capacitor 38-3 to be instantly discharged through the diode 39-9, resistor 39-10, terminal T2 and second switching means 43, even if the capacitor 38-3 has been already charged. Since, at this time, the current supplied to the base of the transistor 39-3 through the resistor 39-16 and diode 39-17 flows through the diode 39-18, resistor 39-10, terminal T2 and second switching means 43, the anode voltage of the diode 39-17 of the comparing and holding circuit 39 drops, and the transistors 39-3, 39-14 are compulsorily turned off, irrespective of their conditions. Hereupon, the output at the terminal T4 is nothing. The integrator circuit 38 and the comparing and holding circuit 39 are set into their initial state. Where a vehicle is running with the display lamp 40a, 40b, 40c, 40d intermittently lighted to indicate the right or left turn of the vehicle, said lighting terminates through one of the undermentioned two different processes.

Description is first given of the case where a vehicle is running at a lower rate than a critical speed of, for example, 36 km/hr. Since the reed switch 35 is turned on and off at a longer interval in the case of the low traveling speed of the vehicle, the integration capacitor 36-6 of the speed signal circuit 36 is charged slowly. When the reed switch 35 is operated, the integration capacitor 36-3 is charged and discharged according to the ON-OFF state of the switch 35. The current caused by the charge-discharge operation is rectified and smoothed through the diodes 36-4, 36-5 and the capacitor 36-6 to deliver a voltage across the resitor 36-7 substantially proportional to the ON-OFF rate.

Figure 10:
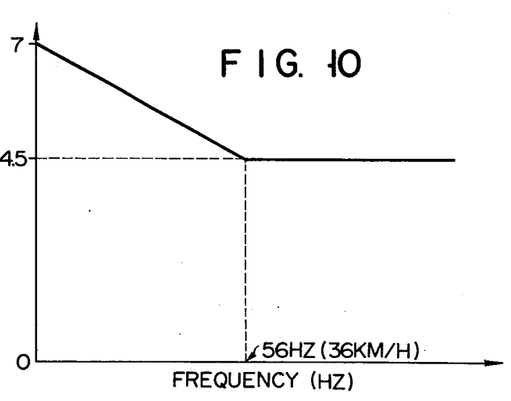
FIG. 10 is a graph showing the relationship between an output voltage from a saturable circuit included in FIG. 7 and the traveling speed of a vehicle.
Figure 11:
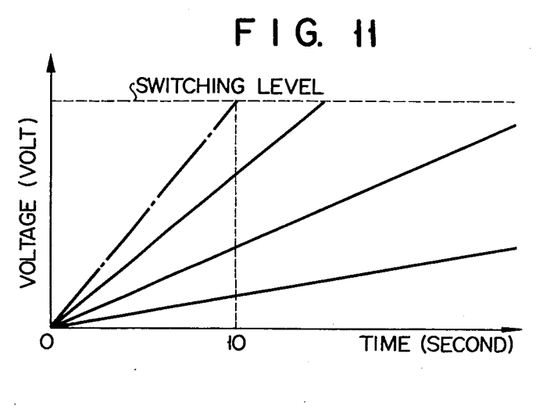
FIG. 11 is a graph showing the relationship between an output voltage from an integrator circuit included in FIG. 7 and time.

In contrast where, a vehicle is running at a slowly increasing speed, then the reed switch 35 is turned on and off at a gradually accelerated rate, giving rise to the slow charge of the capacitor 36-6. As a result, the base voltage of the transistor 37-1 and in consequence the output of the transistor 38-1 drops. The voltage dropping rate is proportional, as shown in FIG. 10, to the intermittent operating speed of the reed switch 35 and in consequence the running speed of a vehicle. The emitter voltage of the transistor 37-1 drops to a value defined by the voltage division resistors 37-2, 37-3 and 37-4, but when the vehicle speed exceeds the critical speed, the emitter voltage becomes constant due to the OFF state of the transistor 37-1. Referring to FIG. 10, when the vehicle speed is zero, the transistor 38-1 has a base voltage of about 7 volts. The base voltage drops in proportion to the running speed of a vehicle until the speed reaches about the critical level of 36 km/hr. When the vehicle speed indicates said critical level of 36 km/hr, then the base voltage of the transistor 38-1 stands at about 4.5 volts.

Where, as mentioned above, an output voltage from the speed signal circuit 36 which is impressed on the base of the transistor 37-1 falls in proportion to the vehicle speed after release of the operation of the actuating lever 11 when the vehicle moves at a slower speed than 36 km/hr, then the emitter voltage of the transistor 37-1 drops accordingly. This voltage drop is transmitted to the base of the transistor 38-1, giving rise to a proportional increase in the collector current thereof. Thus the transistor 38-1 converts its base voltage into a collector current to charge the capacitor 38-3. The charging current of the capacitor 38-3 is proportional to the vehicle speed when the vehicle runs at a slow speed, and is held constant when the transistor 37-1 is turned OFF. Therefore, though the capacitor 38-3 is charged not when a vehicle stands at rest, it is charged when the vehicle is running at a rate corresponding to the vehicle speed. Namely, a period required for the capacitor 38-3 to be charged again through the conduction of the transistor 39-3 to a prescribed switching level after being once discharged by operation of the actuating lever 11 becomes proportional to a distance covered by a vehicle after release of the actuating lever 11. In other words, the lighting of the direction display lamps 40a, 40b, 40c, 40d which is commenced by operation of the actuating lever 11 where a vehicle travels at a lower rate than the critical speed of 36 km/hr continues until the vehicle covers a prescribed distance, thereby enabling the vehicle safely to make a left turn, for example, at a junction. Different lengths of time required for the capacitor 38-3 to be charged to a switching level according to the traveling speed of a vehicle are indicated by various solid lines in FIG. 11. As apparent from FIG. 11, a higher speed of the vehicle results in a sharper gradient of the solid lines, that is, a quicker charge of the capacitor 38-3 to a switching voltage level.

There will now be described the case where a vehicle moves at a higher rate than the critical speed of 36 km/hr. A higher speed of the vehicle than said critical level leads to a higher charged voltage of the capacitor 36-6 and in consequence a quicker decline in the base voltage of the transistor 37-1. Where the emitter voltage of the transistor 37-1 is lower than a predetermined level collectively defined by the resistors 37-2, 37-3, 37-4, the transistor 37-1 is rendered inoperative. Later, the base voltage of the transistor 38-1 is kept at about 4.5 volts as shown in FIG. 10. At this time, since the charging rate of the capactior 38-3 is held constant, the capactior 38-3 is again charged in a fixed length of time to a switching level. Said period of charging is about 10 seconds as shown by a dot-dash line in FIG. 11. Where a vehicle is running at a higher speed than 36 km/hr, the charging period of 10 seconds remains unchanged regardless of the traveling speed of the vehicle. For example, where the actuating lever 11 swings to indicate a right turn of a vehicle while it is moving at a speed of, for example, 40 km/hr, then the direction display lamps 40a, 40b immediately commence intermittent lighting. This intermittent lighting continues for about 10 seconds after the release of the actuating lever 11 and is brought to an end by an output from the comparing and holding circuit 39. Where, therefore, a vehicle makes an outrun at such a high speed as 40 km/hr, the direction display lamps 40a, 40b are kept flashing for 10 seconds, enabling said outrun to be carried very safely.

The critical running speed of a vehicle used as the base on which the subject self-cancelling turn signal system should have its operational mode changed was described to be 36 km/hr. Obviously, this critical running speed can be varied by properly selecting the resistance values of the base bias resistors 37-2, 37-3, 37-4 of the transistor 38-1. Further, the circuit of FIG. 7 can be operated with the same effect, even if the capacitor C of the flasher-relay unit is replaced by a capacitor C' connected between one end of the voltage coil LV and ground as shown in a broken line in FIG. 7.

Figure 12:
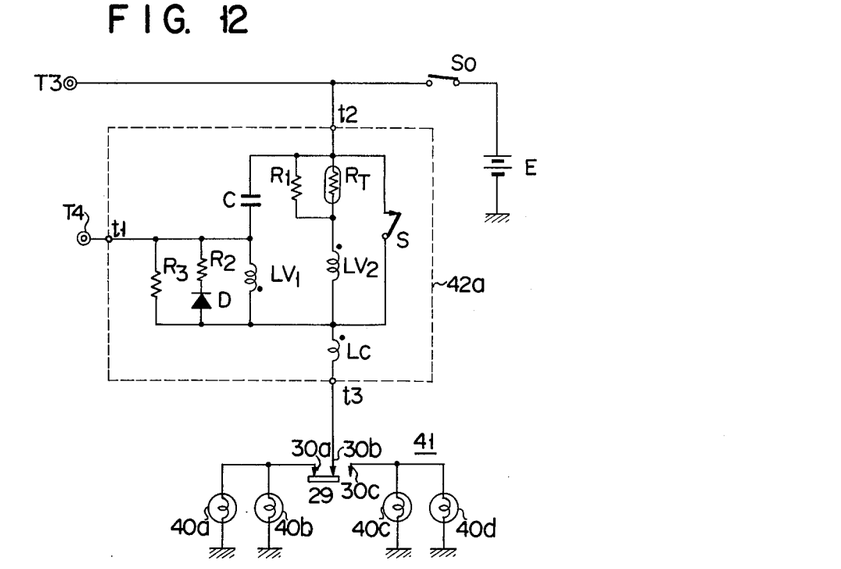
FIG. 12 is another circuit diagram of an intermittent lighting device of a direction display lamp included in FIG. 7.

FIG. 12 shows a modification 42a of the flasher-relay unit 42 of FIG. 7. The same parts of FIG. 12 as those of FIG. 7 are denoted by the same numerals. Referring to FIG. 12, a normally open relay switch S and current coil LC are connected in series between the terminals t2, t3. A series circuit comprising the capacitor C and first voltage coil LV1 is connected in parallel with the relay switch S. The terminal t2 is connected to one end of a second voltage coil LV2 through a parallel circuit comprising a resistor R1 and a thermal compensation resistor RT. The other end of the second voltage coil LV2 is connected to one end of the current coil LC. A resistor R3 and a series circuit comprising a resistor R2 and a diode D are connected is parallel to both ends of the first voltage coil LV1. A junction between the capacitor C and the first voltage coil LV1 is connected to the output terminal T4 of the comparing and holding circuit 39.

Where the movable contact 29 of the second switching means 41 is positioned between the contacts 30a, 30b, for example, by operation of the actuating lever 11 during the running of a vehicle, then current passes through the second voltage coil LV2 and current coil LC, and current required to charge the capacitor C is introduced into the first voltage coil LV1. The magnetomotive forces of the first and second voltage coils LV1, LV2 are chosen to act in opposite directions as shown in FIG. 12 to offset each other, leaving the relay switch S open. Since small current runs through the direction display lamps 40a, 40b, they are not lighted. When the capacitor C is charged, the relay switch S is closed by the magnetomotive force of the second voltage coil LV2. At this time, the direction display lamps 40a, 40b are lighted, because they receive an increased amount of current. The capacitor C discharges its stored energy through the relay switch S. The magnetomotive force of the discharge current acts in the same direction as that of the current coil LC, leaving the relay switch S closed. When the discharge of the capacitor C proceeds, the modification of FIG. 12 is designed such that the magnetomotive force of the first voltage coil LV1 decreases and consequently the current coil LC is made to have too small a magnetomotive force to close the relay switch S. As the result, the relay switch S is opened to extinguish the direction display lamps 40a, 40b.

The capacitor C is charged again starting with the above-mentioned condition. Since, at this time, the magnetomotive force of the first voltage coil LV1 acts in an opposite direction to that of the second voltage coil LV2, the relay switch S remains open. Later, the direction display lamps 40a, 40b commence intermittent lighting in the same manner as described above.

Where a control signal is sent forth from the output terminal T4 of the comparing and holding circuit 39 to the terminal t1, then current runs through the first voltage coil LV1 in the direction in which the magnetomotive force of the second voltage coil LV2 is cleared, leaving the direction display lamps 40a, 40b extinguished.

Figure 13:
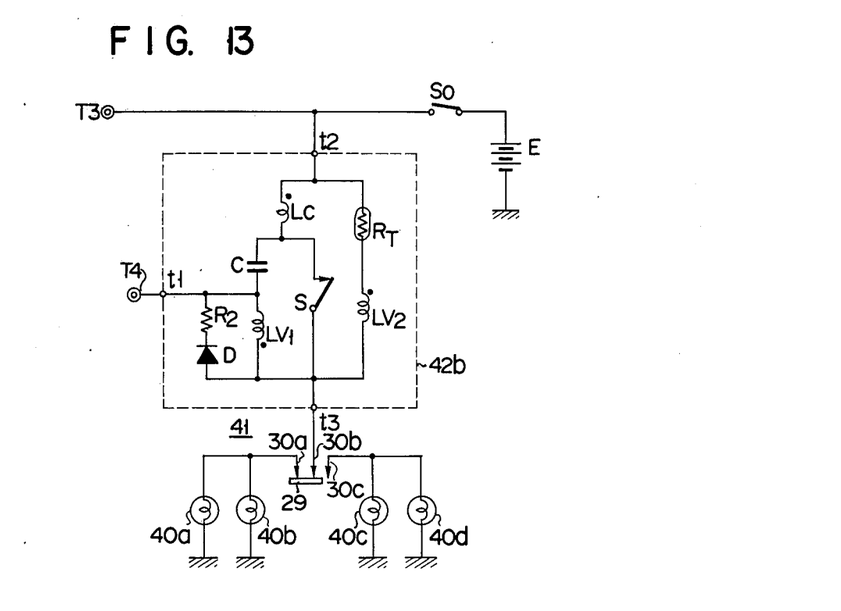
FIG. 13 is a further circuit diagram of another modification of the intermittent lighting device of FIG. 7.

FIG. 13 is a circuit diagram of still another modification of the flasher-relay unit 42 of FIG. 7. The same parts of FIG. 13 as those of FIG. 12 are denoted by the same numerals. Connected in series between the terminals t2, t3 are the resistor RT and second voltage coil LV2 are current coil LC and normally open relay switch S. The capacitor C and first voltage coil LV1 are connected to both ends of the relay switch S. A series circuit comprising the resistor R2 and the diode D is connected in parallel to the first voltage coil LV1.

Where, during the running of a vehicle, the movable contact 29 of the second switching means 41 is located between the contacts 30a, 30b by operation of the actuating lever 11, then the second voltage coil LV2 is energized through the resistor RT, and also the current coil LC and first voltage coil LV1 are energized by the charge current of the capacitor C. At this time, too, the magnetomotive forces of the first and second voltage coils LV1, LV2 act in opposite directions, as shown in FIG. 13, to offset each other, thereby opening the relay switch S and preventing the direction display lamps 40a, 40b from being lighted.

When the charge of the capacitor C is brought to an end, the relay switch S is closed by the magnetomotive force of the second voltage coil LV2 alone. As the result, current passes through the direction display lamps 40a, 40b through the current coil LC and relay switch S to light said lamps 40a, 40b. The capacitor C is discharged through the relay switch S and the first voltage coil LV1. The magnetomotive force of the first voltage coil LV1 resulting from the discharge current acts in the same direction as that of the current coil Lc, keeping the direction display lamps 40a, 40b lighted.

When the discharge of the capacitor C ceases, the relay switch S is opened to extinguish the direction display lamps 40a, 40b.

Later, the above-mentioned operation is repeated to attain the intermittent lighting of the direction display lamps 40a, 40b.

When a control signal is issued from the output terminal T4 of the comparing and holding circuit 39 to the terminal t1, then a magnetomotive force is produced in the first voltage coil LV1 in the direction in which the magnetomotive force of the second voltage coil LV2 acts, leaving the direction display lamps 40a, 40b extinguished.

In the circuits of both FIGS. 12 and 13, an amount of current traveling through the current coil LC is defined by the required current of the direction display lamps. For example, where the wire (i.e., filament) of one of the direction display lamps 40a, 40b is broken, the load current decreases by that extent. As the result, the relay switch S is closed by the current coil LC for a shorter time, accelerating the flashing cycle of the remaining lamp. Therefore, the modifications (FIGS. 12 and 13) of the flasher-relay unit 42 of FIG. 7 have the advantage of indicating the breakage of the wire or filament of any of the direction display lamps. In this connection, the unit 42 of FIG. 7 indicates the breakage state of the display lamps by continuously lighting the live lamps.

As mentioned above, the self-cancelling turn signal system of this invention has a switch mechanism of an automatic spring-back type including an actuating lever. In operation, when the actuating lever is released, it instantly regains an initial position while the switch assembly for lighting the direction display lamps remains at its moved position without applying any additional holding force. The termination control for the direction indication is automatically performed by electronic means, offering a great advantage in application. Particularly, the automatic electronic termination of said lamp display is effected on the basis of a distance covered by a vehicle after operation of the actuating lever, where it runs at a slower speed than prescribed; or on the basis of a length of time for which the vehicle has traveled after operation of the actuating lever, where the vehicle moves at a higher speed than preset, thereby unfailingly realizing a safe running of a vehicle. Further advantages of the turn signal system of this invention are that a circuit for automatic electronic termination of lamp display of directions is automatically brought back to its original position, eliminating the necessity of providing any excess mechanisms or carrying out any excess mechanical operation; and that the termination of the display lamps can be performed by a small amount of electric power without using, for example, an electromagnetic solenoid consuming a large amount of power. These features render the subject turn signal system well adapted to be applied to a motorcycle equipped with a small capacity battery.

What we claim is:

1. A turn signal system for a vehicle comprising:
   at least one direction display lamp for indicating a right turn and a left turn of the vehicle, said lamps being respectively provided on the right and left sides of the vehicle;
   flasher means coupled to said display lamps for intermittently lighting at least one direction display lamp, said flasher means having a control input for receiving a control signal; and means responsive to a control signal for electrically terminating the operation of said flasher means to extinguish said at least one direction display lamp;
   an actuation switch device for mechanically switching the right or left direction display lamp including a self-returning actuating lever and a selectively movable block means moved by the operation of the actuating lever, said selectively movable block means including:
      contact means coupled to said flasher means for causing said intermittent lighting of the right or left direction display lamp as a function of the direction of actuation of the actuating lever; and
      means for retaining said movable block means in its moved position when the actuating force is released from the actuating lever and the actuating lever returns to its initial position;

a source of a signal which is a function of the traveling speed of the vehicle;

control means coupled to said control input of said flasher and responsive to the return of said actuating lever after it is actuated and responsive to said signal representing said vehicle traveling speed, for feeding a control signal to said control input of said flasher means for electrically terminating the operation of said flasher means such that when the vehicle speed is below a predetermined speed the control signal is generated when the vehicle finishes running a predetermined distance, and when the vehicle speed is above said predetermined speed the control signal is generated when the vehicle finishes running for a predetermined time; and means for electrically establishing initial conditions in said control means in response to actuation of the actuating lever of the actuation switch device.

2. The turn signal system according to claim 1 wherein said selectively movable block means has a neutral position in which said right or left direction display lamp is extinguished irrespective of the operation of the control means.

3. The turn signal according to claim 1 wherein said control means comprises means for detecting the traveling speed signal of the vehicle and means for generating a first signal which is a function of the covered distance of the vehicle until said speed signal reaches a predetermined value and for generating a second signal which is a function of the traveling time period when said detected speed signal exceeds said predetermined value.

4. The turn signal system according to claim 1 wherein said control means comprises means responsive to said signal representing the traveling speed of the vehicle for detecting the traveling speed of the vehicle and for generating a speed signal, saturable means for maintaining said speed signal at a predetermined value when the speed signal reaches said predetermined value, an integration means for integrating the output of the saturable means, and comparing and holding means for comparing the output of the integration means with a reference value and for generating said control signal for holding said flasher means inoperative when the output of the integration means exceeds said reference value.

5. The turn signal system according to claim 4 wherein said flasher means comprises current and voltage coils, a relay contact driven by said current and voltage coils, and a capacitor for holding the relay contact opened or closed for a relatively short time period, whereby when said control signal is delivered from said control means the relay contact is forcedly set to be opened irrespective of the charging state of the capacitor.

6. The turn signal system according to claim 4 wherein said comparing and holding means comprises means for feeding the output back to the input side thereof to thereby hold a given state.

7. A turn signal system for a vehicle comprising: an actuation switch device including:

an actuating lever which is swingable relative to an initial neutral position to indicate a right or left turn of the vehicle and which is capable of being pushed and displaced inwardly;

means for automatically returning said actuating lever to said initial neutral position when an operative swinging force is released;

a switch assembly having fixed contacts and a selectively movable block coupled to said actuating lever, a part of said selectively movable block and said fixed contacts comprising first switching means and said block being movable to a right or left turn-indicating position responsive to swinging of said actuating lever or to a neutral position responsive to a pushing in of said actuating lever, and said second switching means comprising contacts provided on said actuating lever and fixed contacts associated therewith;

at least one direction display lamp provided on said vehicle to indicate a right turn and a left turn of the vehicle, respectively;

flasher means coupled to said at least one direction display lamp for intermittently lighting said at least one direction display lamp in response to the movement of said selectively movable block to a position for indicating a right or left turn of the vehicle, said flasher means including a control input and means responsive to a control signal at said control input for electrically terminating the operation of said flasher means to extinguish said at least one direction display lamp;

control means coupled to said control input and responsive to the speed of the vehicle exceeding a predetermined speed for generating a control signal when the vehicle has run for a predetermined time after operation and release of the actuating lever, and responsive to the speed of the vehicle being below said predetermined speed for generating a control signal when the vehicle has covered a predetermined distance after operation and release of the actuating lever; and means coupled to said second switching means for electrically establishing initial conditions in said control means in response to the actuation of the actuating lever.

8. The turn signal system according to claim 7, wherein the actuation switch device further includes an engagement mechanism for retaining said selectively movable block at a right or left designated position; and a guide and engagement mechanism for shifting said selectively movable block to its said neutral position upon the pushing in of the actuating lever.

9. The turn signal system according to claim 7, wherein said flasher means includes means responsive to said selectively movable block occupying its said neutral position for terminating the intermittent lighting of the direction display lamp independent of the action of said control means.

10. The turn signal system according to claim 7, wherein said control means includes means for detecting the running speed of the vehicle.

11. The turn signal system according to claim 7, where said control means includes means for detecting the running speed of the vehicle; saturable means coupled to the speed detecting means for producing a linear output until the detected running speed reaches predetermined value and for generating a saturation output when said detected running speed reaches said predetermined value; integration means coupled to the saturable means for integrating an output from the saturable means; and comparing and holding means coupled to the integration means for comparing the output from the integration means with a reference value and for maintaining said flasher means inoperative while the integration means continues to produce an output having a larger value than the reference value.

12. The turn signal system according to claim 11, comprising power supply terminals, and wherein said flasher means includes a first relay coil and relay contact connected with the first switching means and direction display lamps in series between the power supply terminals; a second relay coil connected between the control signal output of said control means and first switching means; means for opening or closing said relay contact as a function of the magnitude of the current passing through the first and second relay coils; a capacitor for keeping the relay contact opened or closed for a relatively short length of time; and means for energizing the second relay coil to open the relay contact upon receipt of a control signal output from said control means.

13. The turn signal system according to claim 11, wherein the comparing and holding means includes means for feeding an output signal from the comparing and holding means back to an input terminal thereof, said feedback means enabling the comparing and holding means to keep producing an output signal.

14. The turn signal system according to claim 7, wherein the actuation switch device is received in a casing; and the actuating lever includes a knob provided at one end and a driving portion comprised of a fan-like plate and disposed at the other end, the foremost edge of the fan-like plate being formed into a flattened generally V-shape with a notch cut out substantially at the center thereof.

15. The turn signal system according to claim 14, further comprising a supporting block in the casing so as to face the driving fan-like plate of the actuating lever and having an elongate cavity to allow the movement of said fan-like plate in the axial direction of the actuating lever; and a steel ball and a spring normally urging said ball received in said elongate cavity; the actuating lever being normally pressed toward the outside of the casing by the steel ball urged by the spring; and, where the actuating lever swings to the right or left, the steel ball rolls along the generally V-shaped edge of the driving end portion of the actuating lever.

16. The turn signal system according to claim 15, wherein the actuating lever has an engagement notch extending lengthwise of said lever such that when the operative swinging force is released from the actuating lever at its swung position, the actuating lever automatically returns to its initial neutral position by the urging force of the spring and the action of the generally V-shaped edge of the driving fan-like plate, said steel ball engaging into the engagement notch in said generally V-shaped edge to positively retain said actuating lever in its initial neutral position.

17. The turn signal system according to claim 15, wherein the driving fan-like plate of the actuating lever is provided with a pair of pins extending substantially perpendicular to the working plane of the actuating lever; the selectively movable block is received in the casing so as to face the driving fan-like plate of the actuating lever and is selectively movable to the right or left jointly with the corresponding swinging of the actuating lever by means of one of said paired pins.

18. The turn signal system according to claim 17, wherein the selectively movable block includes a selectively movable member and a movable contact integrally formed therewith; said selectively movable member has a guide and engagement mechanism comprised of a guide projection whose peripheral guide wall defines a tapered cross section which is symmetrical relative to the axial line of said guide projection and gradually broadening in the direction in which the actuating lever is pushed in; one of the paired pins of the actuating lever being pressed against the peripheral guide wall of said guide projection according to the right or left swing of the actuating lever to shift the selectively movable member similarly to the right or left; and according to the pushing in of the actuating lever to shift the selectively located member to a neutral position.

19. The turn signal system according to claim 18, wherein the casing contains a plurality of fixed contacts provided for selective engagement with a single movable contact and also an engagement mechanism for shifting the movable contact to the right or left to light the direction display lamp for indicating a right or left turn of a vehicle or to a neutral position to extinguish the direction display lamp.

20. The turn signal system according to claim 19, wherein the selectively movable member has a cavity for receiving a steel ball and a spring for urging the steel ball toward the outside of the selectively movable member, the casing having an engagement notch into which the steel ball of the selectively movable member is inserted when the selectively movable member is shifted to the right or left; whereby when the steel ball of the selectively movable member is pressed into the engagement notch by the urging force of the spring, the selectively movable member is brought to rest and retained at a prescribed position.

21. The turn signal system according to claim 15, wherein the driving fan-like plate of the actuating lever is provided with a pair of conductive pins extending perpendicular to the working plane of the actuating lever; a pair of elastic contact strips are disposed apart from both sides of the actuating lever and selectively engageable with said conductive pins; whereby when the actuating lever swings to the right or left, one of the paired conductive pins selectively contacts the corresponding one of the paired elastic contact strips to constitute the second switching means.

* * * * *